United States Patent [19]

Geiger

[11] 4,013,812

[45] * Mar. 22, 1977

[54] LAMINATED FABRIC

[76] Inventor: David H. Geiger, Kirby Lane, Rye, N.Y. 10580

[*] Notice: The portion of the term of this patent subsequent to Aug. 12, 1992, has been disclaimed.

[22] Filed: Aug. 5, 1975

[21] Appl. No.: 602,114

Related U.S. Application Data

[63] Continuation-in-part of Ser. No. 381,065, July 20, 1973, Pat. No. 3,899,622.

[52] U.S. Cl. .............................. 428/245; 428/251; 428/268; 428/273; 428/290; 428/336; 428/422

[51] Int. Cl.² ..................... B32B 7/04; B32B 31/06

[58] Field of Search .......... 428/245, 268, 273, 290, 428/336, 422, 251

[56] References Cited

UNITED STATES PATENTS

| | | | |
|---|---|---|---|
| 3,542,633 | 11/1970 | Goldsmith | 428/245 X |
| 3,899,622 | 8/1975 | Geiger | 428/245 |

*Primary Examiner*—Marion E. McCamish
*Attorney, Agent, or Firm*—Arthur V. Smith; Pasquale A. Razzano

[57] ABSTRACT

A composite sheet for use in membrane type roof constructions or the like comprises a foraminous web formed of a plurality of fibers coated or impregnated with a heat sealable plastic material and being heat sealed to a compatible thin film of plastic sheet material. The thin film sheet material is preferably transparent, so that the composite sheet is transparent through the openings in the foraminous web.

16 Claims, 8 Drawing Figures

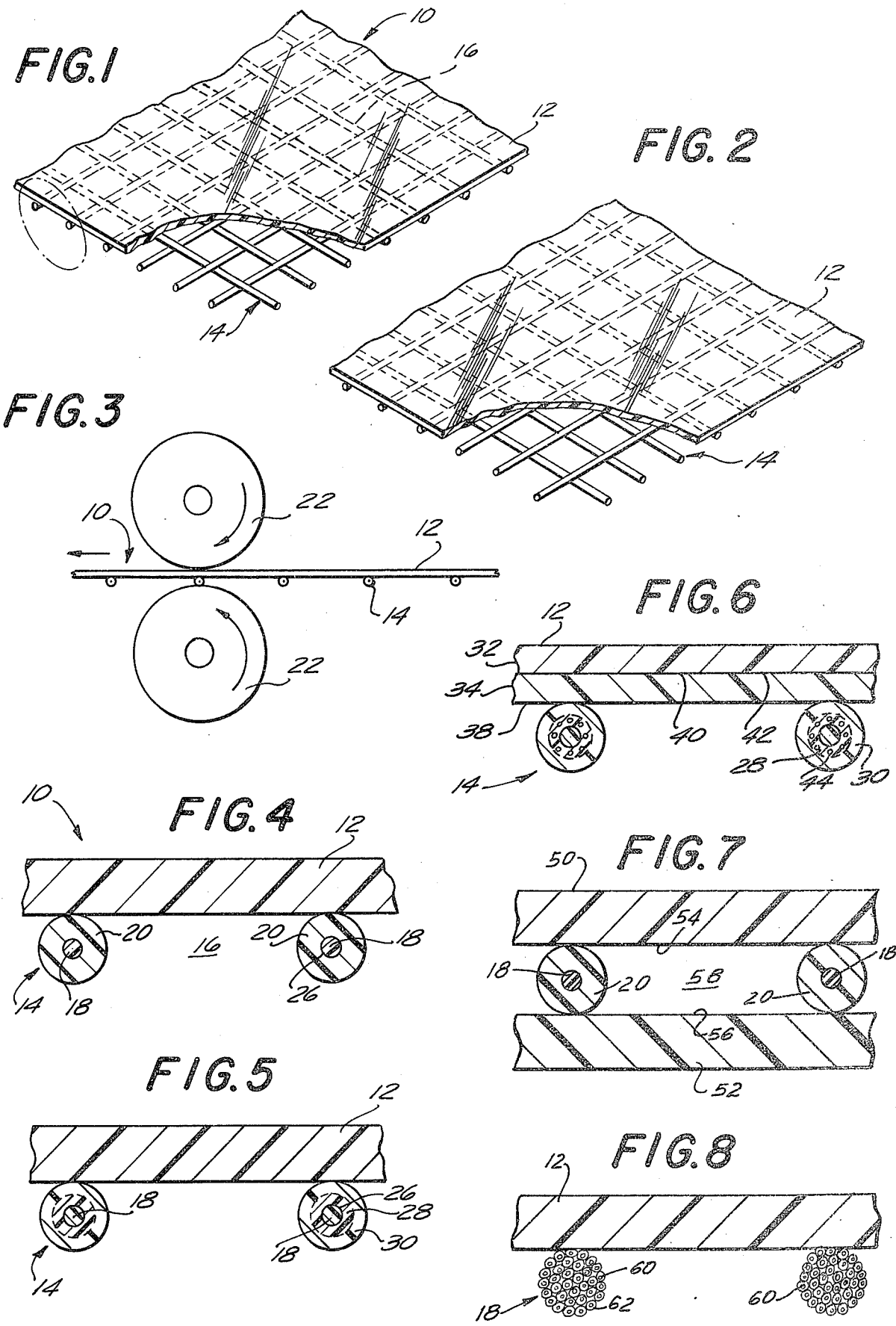

LAMINATED FABRIC

This application is a continuation-in-part of copending U.S. patent application Ser. No. 381,065 filed July 20, 1973 now U.S. Pat. No. 3,899,622.

The present invention relates to composite sheet materials and more particularly to a composite sheet of plastic film and reinforcing web which are adapted to be used in membrane constructions for building roofs, domes, air inflated structures and the like.

In many types of building constructions flexible sheet material is used to form a portion of the roof of the structure. This occurs, for example, in lightweight temporary building structures such as tents, geodesic domes, air inflated building constructions, and the like. Typically, such materials must have relatively high strength, particularly in air inflated structures wherein the membrane actually forms a structural element of the building.

Although various types of membranes have been previously proposed for use in such structures, those membranes have presented numerous problems, particularly with respect to the fact that the previously proposed materials must be relatively heavy in order to have the necessary strength. Moreover, such previously proposed membranes are usually formed of tightly woven materials so that they are opaque, or at best translucent. As a result, it is not possible to use such materials in applications where it is desirable that the roof or material be transparent to provide visibility to the outside of the structure; moreover, such materials tend to trap infrared heat within the building since they are not transparent to such heat. As a result, excess air conditioning and air treatment systems are required in order to handle the trapped heat within building constructions using such previously proposed membranes.

Accordingly, it is an object of the present invention to provide a relatively lightweight sheet material having high strength and being adapted for use as a membrane in building constructions.

Yet another object of the present invention is to provide a sheet material which is adapted for use as a membrane in building constructions and which is transparent to infrared heat.

Yet another object of the present invention is to provide a composite reinforced sheet material for use in building constructions wherein the reinforcing elements of the sheet are protected against wear and exposure to the elements.

In accordance with one aspect of the present invention, a composite sheet material adapted to be used as a membrane material in a building construction, and in particular in an air inflated building construction, is formed a thin relatively lightweight film of plastic material such as heat sealable plastic materials including polytetrafluoroethylene, other fluorocarbons, polyethylene, polyvinylchloride or silicon. The film is reinforced by a foraminous fiber web, e.g., a fiberglass web, which is coated or impregnated with a plastic heat sealable coating material compatible to the plastic sheet material and secured thereto by heat sealing or the like so that the fiber web is bonded to the thin film. By this construction, the openings in the web form transparent windows in the film material so that when the composite sheet is used in a building construction, the occupants of the building have relatively good visibility to the outside. In addition, with certain of these films, the transparent film permits trapped infrared heat or radiation within the building to be radiated out of the building through these transparent windows.

The sheet material formed in accordance with the present invention is also relatively inexpensive since only a single film or sheet of plastic material is required which, in turn, is reinforced by the fiberglass web. The web is securely bonded to the sheet by the plastic coating over the fibers of the web and the composite sheet formed in this manner has substantial strength.

The above, and other objects, features and advantages of the present invention, will be apparent in the following detailed description of an illustrative embodiment thereof which is to be read in connection with the accompanying drawing wherein:

FIG. 1 is a perspective view of a portion of a composite sheet material constructed in accordance with the present invention;

FIG. 2 is a perspective view, with parts broken away, of a composite sheet material constructed in accordance with another embodiment of the present invention;

FIG. 3 is a schematic elevational view of the apparatus used for bonding the foraminous web to the sheet material;

FIG. 4 is an enlarged end view of the sheet material shown in FIG. 1; and

FIGS. 5 through 8 are end views, similar to FIG. 4, of other embodiments of the invention.

Referring now to the drawing in detail, and initially to FIG. 1, it will be seen that a composite sheet material 10, constructed in accordance with the present invention, is formed from a relatively thin film 12 of a transparent heat sealable plastic material, secured to a web 14 of fibers. Sheet material 12 may be formed of any suitable, preferably transparent, heat sealable plastic material; and it has been found that polytetrafluoroethylene film is highly satisfactory particularly for use in forming membrane for air inflated dome type structures and the like, although other fluorocarbons, such as for example those sold under the tradenames "Kynar," "Kel-F," "Halar," "Tefzel" and "Aclar," and other plastics or materials such as polyethylene, polyvinylchloride or silicon may also be used.

Web 14 may be in the form of a woven foraminous layer, such as shown in FIG. 1, and preferably is formed of woven fiberglass fibers. The particular type of weave may be a simple over and under weave, as seen in FIG. 1, or the more complex leno weave, or any other type of weave which provides the desired strength characteristics in the sheet material as are required for the particular use to which the sheet is to be placed. In any case, the weave is formed with openings 16 between the fibers so that the web is foraminous and the composite sheet material formed by the web and sheet 12 will be transparent. Alternatively, web 14 may be a scrim, as seen in FIG. 2, with the fibers thereof arrayed in a regular or irregular pattern as desired.

As seen most clearly in FIG. 4, fibers 18 of the web 14, are coated with a heat sealable plastic material 20 which is compatible to the plastic material of which the sheet or film 12 is formed. This coating may be applied to the web or fibers by dispersion coating or by coating in any other convenient manner prior to bonding of the web to the plastic film 12. After the coating 20 is sufficiently dried over fibers 18, web 14 and sheet 12 are brought together, as seen in FIG. 3, between a pair of pressure rollers 22, one or both of which may be heated, so as to form a heat seal between sheet 12 and the coating 20. In this manner, the fiberglass fibers 18, which provide the reinforcing strength to the composite sheet 10, are securely bonded to the transparent film 12.

It is noted that in previously proposed structures the fiberglass fibers 18 typically are embedded in plastic layer 12 to reinforce the same or are sandwiched between sheet 12 and another complementary sheet, in order to be bonded by the additional sheet to the sheet 12. However, such membrane constructions are relatively expensive and difficult to produce. Moreover, such constructions render the sheet non-transparent because the two films of plastic which are bonded together lost their transparency at their interface-bonded surfaces. Accordingly, by the construction of the present invention as shown in FIG. 4, the composite sheet 10 remains transparent in the window 16 formed between the fibers 18, and the construction is also substantially less expensive since only a single sheet of plastic film is required.

In the manufacture of the sheet material of the invention it is often desirable to coat the fibers 18 of the fiberglass web 14 with a layer 26 of silicon prior to the application of the plastic coating 20 thereto. The silicon layer 26 on the fiberglass fibers wets the surface of the fibers and protects the fiberglass against attack by water. The fiberglass fibers are further protected thereafter by the coating 20 of heat sealable plastic (e.g., polytetrafluoroethylene) which encases the silicon around the fiberglass fibers, thereby protecting the silicon and the glass fibers, in addition to serving as a bonding material securing the glass fibers to the film 12.

Preferably, sheet material 10, as shown in FIG. 4, is used in the building construction with the sheet 12 thereof exposed to the exterior of the building, i.e., with the fiberglass web 14 located on the interior of the building. By this construction the fiberglass fibers have a double protection from the elements and the eroding characteristics thereof, i.e., by the sheet of material 12 and the coating 20 itself. Thus, there is a preferential protection of the fiberglass with the sides thereof facing the elements being doubly protected while the interior sides, i.e., the side facing the interior of the building, is only protected by the coating 20.

In one embodiment of the invention fiber coating 20 may also be provided with a plurality of minute glass beads embedded therein to improve the abrasion or wear characteristics of the coating against deterioration by abrasion from air carried particles or the like.

As mentioned, the spacing between fibers 18 in web 14 is selected so as to provide windows 16 between the fibers to take advantage of the transparency of film 12. Preferably, the web is formed such that the openings 16 occupy at least 10% of the area of the film. This will let the light from the exterior of the building enter the building, and will permit individuals inside of the building to look out. In one embodiment of the present invention the sheet or film 12 is provided in a thickness of between ½ to 5 mils, with the windows 16 having widths or dimensions of approximately one-fourth of an inch. This is accomplished by providing the fiberglass web formed from fibers having a diameter, when coated, of about ⅛ inch and being spaced ⅜ inch on center. Typically, the coating on such fibers would be between ½ to 5 mils. In one embodiment formed in accordance with this example, it was found that the tensile strength of the material was between 200 and 600 psi.

Another advantage of the present invention, particularly when polytetrafluoroethylene or other fluorocarbon plastics are used and the foraminous web 14 renders the composite sheet transparent, is that the polytetrafluoroethylene sheet material 12 is also transparent to infrared heat or radiation. Thus, when the sheet material of the present invention is used in a building construction solar energy and light will enter the building through windows 16; however, ground heat or heat inside of the building generated as a result of the solar energy entering the building will be re-radiated out of the building as infrared radiation. The polytetrafluoroethylene film is substantially more transparent to such infrared radiation than is glass; thus a substantially larger amount of such infrared heat will be allowed to pass out of the building through the roof by this material. This substantially reduces the amount of cooling or air conditioning equipment required for use in the building construction utilizing the composite sheet material of the present invention.

Another embodiment of the present invention is illustrated in FIG. 5 of the drawing wherein it is seen that the sheet 12 is heat sealed to glass fibers 18 of a web 14, which has been coated with two types of plastic material. That is, the fibers 18 are first coated with the silicon layer 26, as described above, and then are coated with an inner layer of plastic 28 and, after that layer has solidified, with an outer heat sealable plastic layer 30. Preferably, inner layer 28 is formed of a plastic material having a melting temperature which is substantially higher than the melting temperature of the plastic material used to form sheet 12. On the other hand, the coating or layer 30 is formed of a plastic material which is the same as the material used to form sheet 12 or which is compatible to that material and has substantially the same melting temperature. In this manner, when sheet 12 and web 14 are passed through the heating and compression rollers 22, the outer coating 30 of the web will be softened and melted so as to be heat sealed to the softened sheet material 12. However, because of the higher melting temperature of the inner layer 28, that layer will remain substantially solid. In this manner, the fibers 18 are fully enclosed and encased in the protective plastic coating 28 during the heating operation and are not exposed as a result of the melting of the outer layer 30. This embodiment of the invention is preferably formed with polytetrafluoroethylene plastic materials although, as mentioned above other heat sealable plastic materials can also be used. Thus, sheet 12 may be formed of a commercially available FEP Teflon material, while the fiberglass fibers 18 are coated first with a TFE Teflon material, to form layer 28, and then with FEP Teflon to form the layer 30. As is well known, commercially available TFE Teflon has a substantially higher melting temperature than the commercially available FEP Teflon.

Another embodiment of the invention is illustrated in FIG. 6 of the drawing. In this embodiment, the sheet 12 is formed of two separate sheet members 32, 34. The inner sheet 34 has the web 14 bonded to the inner side 38 thereof, while the outer side 40 of the sheet 34 has a half-silvered metallic coating 42 applied thereto. This coating may, for example, be a vacuum metalized aluminum coating applied to the sheet material in the conventional manner. This coating is used to form a "one way" mirror effect in the sheet material. Typically, the coating may be applied as half-tone dots so that substantially half of the surface area of the sheet material is coated with metal while the remainder, in the form of openings between the metallized dots, remains transparent.

After the metallic layer 42 is applied to the inner film 34, the outer film 32 is secured to the sheet 34 by heat sealing, thereby to protect the metallized layer 42. The two sheets 32, 34 are bonded to each other through the openings in the metallized surface. Thereafter, film 12 is secured by heat sealing to the coated web 14 in the manner described above. This web may be in the form of the web shown in FIGS. 4 or 5, or alternatively, may be in the form shown in FIG. 6 wherein inner and outer layers 28 and 30 are provided; but with the inner layer 28 having glass beads 44 embedded therein to improve the abrasion resistance characteristics of the inner TFE Teflon coating.

In any case, the vacuum metallized film 12 utilizes the advantage of the previously described embodiments, in particular that the film of polytetrafluoroethylene is substantially transparent to admit light into the interior of the building, while the metallized layer reflects solar heat and prevents a substantial portion thereof from entering the building. At the same time, the sheet material is transparent to infrared radiation from the interior of the building so that infrared solar heat entering the building through the transparent layer can pass out of the building again. In addition, the half-silvered, or one-way mirror effect, of sheet 12 permits occupants of the building to look out through the material but at the same time provides privacy from the outside. In one embodiment of the invention it is contemplated that the layer of film 34 of the composite film 12 of FIG. 6 have a thickness of 1 mil while the outer layer 32 have a thickness of 3 mils. The greater thickness in the outer layer is to provide protection for the metallized layer 42 against the elements.

Another embodiment of the form of the invention illustrated in FIG. 6 is shown in FIG. 7. In this embodiment two heat sealable plastic sheets 50 and 52 are utilized, to form the membrane, but they are heat sealed on opposite side of the web 14 to the fiber plastic coating 20, but not to each other. One of the inner faces 54, or 56 of sheets 50, 52 (preferably face 56) is provided with a half-silvered metal coating to provide the one-way mirror effect previously described. The coating is of course protected by the sheets 50, 52. Moreover, since these sheets are not necessarily sealed directed to each other air spaces 58 are formed in the openings 16 between fibers 18 to produce improved insulation in the membrane.

As described in the above-mentioned embodiments, the fibers 18 are coated with the respective heat sealable layers or coating. However in another embodiment of the invention it is contemplated that the heat sealable plastic be impregnated into the fibers to surround the individual filaments of which the fiber strands are formed. That is, as seen in FIG. 8, the fiberglass fibers 18, shown on a larger scale, are formed of individual fibers or filaments 60 which are woven or otherwise intermeshed by the known manufacturing processes to form the main fibers 18 that are used to weave web 14. Thus fibers 18, in the embodiment of FIG. 8 are impregnated with polytetrafluoroethylene or other suitable fluorocarbons and/or heat seal plastics under pressure, or by other known methods, to coat the individual filaments 60 with layers 62 which solidify preferably into a single mass. The impregnated fibers 18 then are woven or positioned to form the web 14 which is, in turn, heat sealed to the membrane or sheet 12. The impregnated plastic in the fibers 18 substantially completely coats all of the individual filaments and is sufficient to form the necessary bond to sheet 12.

Accordingly, it is seen that a relatively inexpensively constructed composite sheet material is provided which is highly advantageous for use in building constructions and particularly in air inflated dome constructions. The material, being formed of plastic materials such as polytetrafluoroethylene, is air impervious and is highly suitable for the latter application. Moreover, since the material is transparent, it will permit light to enter the building and yet will also permit infrared heat and radiation to pass out of the building, thereby reducing the amount of cooling equipment required therefor. In addition, the fiberglass web secured to the heat sealable plastic sheet material provides a composite sheet material having a tensile strength which is substantially greater than that of the sheet alone. On the other hand, the sheet serves as a protective cover for the reinforcing scrim and it a barrier against wear of the fiberglass fibers as a result of exposure to the elements and air carried dust particles or the like.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A composite sheet material comprising a foraminous web formed of a plurality of fibers defining a plurality of openings in the web and a thin film of heat sealable plastic sheet material having a pair of opposite sides, said fibers being coated with a heat sealable plastic material, and said plastic sheet being secured on one side thereof to said plastic coating on said fibers and extending across said openings, thereby to form said composite sheet.

2. The sheet material as defined in claim 1 wherein said plastic sheet material is formed of a transparent plastic, whereby said composite sheet is transparent through the openings in said web.

3. The sheet material as defined in claim 2 wherein said web comprises an unwoven foraminous scrim of fiberglass.

4. The sheet material as defined in claim 3 wherein said plastic coating is formed of polytetrafluoroethylene.

5. The sheet material as defined in claim 4 wherein said web comprises an unwoven foraminous scrim of fiberglass.

6. The sheet material as defined in claim 4 wherein said web comprises a woven foraminous sheet of fiberglass.

7. The sheet material as defined in claim 6 wherein the openings in said foraminous web occupy at least 10% of the area of said web whereby said composite sheet is transparent and will permit infrared heat to pass therethrough from the interior of said building construction.

8. The sheet material as defined in claim 7 wherein said film is between ½ and 5 mils thick, said coating on said fiber is between ½ and 5 mils thick, and the spacing between fibers in said web is approximately one-fourth inch.

9. The sheet material as defined in claim 8 wherein said fibers are one-eighth inch in diameter and are spaced three-eighths inch on center.

10. The sheet material as defined in claim 2 wherein said web comprises a woven foraminous sheet of fiberglass.

11. The sheet material as defined in claim 2 wherein said plastic coating comprises a first inner coating of a plastic material having a melting temperature greater than the melting temperature of said film and a second outer coating of a plastic material having substantially the same melting temperature as said film whereby said film and second coating may be heat sealed together to secure said web to said film without exposing the fibers of said web during the heat sealing operation.

12. The sheet material as defined in claim 2 wherein said film of plastic sheet material comprises inner and outer films, said inner film having a half-silvered metallic surface formed thereon and being bonded to said outer film through said metallic surface, whereby said film of plastic sheet material is relatively transparent and will reflect solar heat.

13. The sheet material as defined in claim 2 including a second sheet of plastic material secured to on one side thereof to said plastic coating or side fibers on the side of the foraminous web opposite the first mentioned sheet, said one side of one of said first and second sheets having a half-silvered metallic surface formed thereon whereby said sheet material is relatively transparent and will reflect solar heat.

14. A composite sheet material comprising a foraminous web formed of a plurality of fibers defining a plurality of openins in the web, said fibers being formed of a multiplicity of intermeshed filaments; and a thin film of a relatively transparent heat sealable plastic sheet material having a pair of opposite sides, said fibers being impregnated with a heat sealable plastic material which substantially completely coats the filaments thereof, and said sheet being secured on one side thereof to said fibers by bonding to the heat sealable plastic material impregnated therein and extending across said openings to form said composite sheet, whereby said composite sheet is substantially transparent.

15. The sheet material as defined in claim 14 wherein said sheet material is formed of transparent polytetrafluoroethylene and said impregnated plastic is formed of a compatible plastic material.

16. The sheet material as defined in claim 15 wherein said inner coating has a plurality of glass beads embedded therein.

* * * * *